United States Patent [19]

Rosenquist

[11] Patent Number: 4,788,274

[45] Date of Patent: * Nov. 29, 1988

[54] COPOLYESTER-CARBONATE RESINS HAVING PENDANT CARBOXYL GROUPS DERIVED FROM POLYCARBOXYLIC ACID MONOESTERS AND CROSSLINKED PRODUCTS THEREFROM

[75] Inventor: Niles R. Rosenquist, Evansville, Ind.

[73] Assignee: General Electric Company, Mt. Vernon, Ind.

[ * ] Notice: The portion of the term of this patent subsequent to Nov. 4, 2003 has been disclaimed.

[21] Appl. No.: 944,034

[22] Filed: Dec. 22, 1986

[51] Int. Cl.⁴ ............................................. C08G 63/62
[52] U.S. Cl. .................................... 528/176; 528/193; 528/194; 528/196
[58] Field of Search ............... 528/176, 193, 194, 196; 524/411, 412, 600

[56] References Cited

U.S. PATENT DOCUMENTS 4,621,130  11/1986  Rosenquist ........................ 528/176

OTHER PUBLICATIONS

Crammand Hammond, *Organic Chemistry* (2nd edition), 1964, pp. 355 and 356.

*Primary Examiner*—Harold D. Anderson
*Assistant Examiner*—Frederick Krass
*Attorney, Agent, or Firm*—Joseph T. Eisele; Martin B. Barancik

[57] ABSTRACT

Thermoplastic copolyester-carbonate resins are described, having included in their polymer chains, a moiety of the formula:

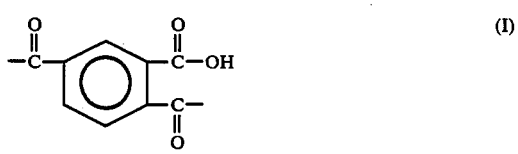

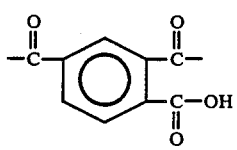

The resins are useful intermediates for branched or cross-linked molding compositions.

5 Claims, No Drawings

COPOLYESTER-CARBONATE RESINS HAVING PENDANT CARBOXYL GROUPS DERIVED FROM POLYCARBOXYLIC ACID MONOESTERS AND CROSSLINKED PRODUCTS THEREFROM

BACKGROUND OF THE INVENTION

1. Field of the Invention

The invention relates to polycarbonate resins and more particularly relates to branched or cross-linked copolyester-carbonate resins and intermediates thereto.

2. Brief Description of the Prior Art

Polycarbonate resins have found wide usage to fabricate a wide variety of articles such as automotive component parts.

A wide variety of copolyester-carbonate resins are also known in the prior art as is the method of their preparation; see for example U.S. Pat. No. 4,487,896.

SUMMARY OF THE INVENTION

The invention comprises a copolyester-carbonate resin, containing in the polymer chain at least one divalent moiety of the formula:

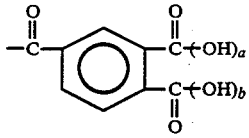   (I)

wherein a and b are each whole number integers of from 0 to 1; and the sum of a +b is 1.

The copolyester-carbonates of the invention are useful as intermediates in the preparation of branched or cross-linked polycarbonate molding resins and as branching or cross-linking additives in polycarbonate and copolyester-carbonate resin compositions

DETAILED DESCRIPTION OF THE PREFERRED EMBODIMENTS OF THE INVENTION

The copolyester-carbonate resins of the invention, i.e.; the resins containing a unit of formula (I), may be prepared by the thermolytic degradation of corresponding copolyester-carbonate resins prepared by the reaction of a carbonate precursor, a dihydric phenol, and a dicarboxylic acid or mixture of dicarboxylic acids selected from those of the formulae:

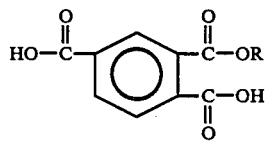   (IIA)

and

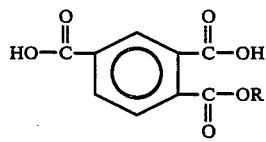   (IIB)

wherein R, is a hydrocarbyl group which is amenable to beta-elimination upon exposure to heat. Rather than using the diacids of the formulae IIA and IIB, it is possible to also use the reactive derivatives of those acids, i.e., the acid halides such as the acid dichlorides or the acid dibromides. Also, these reactive derivatives may be prepared in-situ during the polymerization reaction from the diacids of the formulae IIA and IIB. The preparative reaction with acids (IIA) and (IIB) or their reactive derivatives is carried out under conditions to produce a copolyester-carbonate resin. Such reaction conditions are well known to those skilled in the art of polycarbonate polymer resins and are described, for example, in the U.S. Pat. Nos. 3,028,365; 3,334,154; 3,275,601; 3,915,926; 3,030,331; 3,169,121; 3,027 814; and 4,188,314. In general, the preparation may be carried out by interfacial polymerization or phase boundary separation, solution polymerization and like processes. Interfacial polymerization is preferred.

Although the preparative processes may vary, several of the preferred processes typically involve dissolving or dispersing the reactants in a suitable water immiscible solvent medium and contacting the reactants with a carbonate precursor, such as phosgene, in the presence of a suitable catalyst and an aqueous caustic solution under controlled pH conditions. A molecular weight regulator, that is a chain stopper, may be added to the reactants prior to or during contacting them with a carbonate precursor. Useful molecular weight regulators include, but are not limited to, monohydric phenols such as phenol, chroman-I, paratertiarybutylphenol, and the like. Techniques for the control of molecular weight are well known in the art and may be used in the present process for controlling the molecular weight of the copolyester-carbonate resins. The most commonly used water immiscible solvents include methylene chloride, 1,2-dichloroethane, chlorobenzene, toluene, and the like.

The catalysts which can be employed, if an interfacial polymerization technique is used, accelerate the rate of polymerization of the dihydric phenol reactant with the ester precursor such as the dicarboxylic acid and with the carbonate precursor such as phosgene. Suitable catalysts include but are not limited to tertiary amines such as triethylamine, quaternary phosphonium compounds, quaternary ammonium compounds, and the like.

The preferred process comprises a phosgenation reaction. The temperature at which the phosgenation reaction proceeds may vary from below 0° C., to above 100° C. The reaction preferably proceeds at temperatures of from room temperature (25° C.) to 50° C. Since the reaction is exothermic, the rate of phosgene addition may be used to control the reaction temperature. The amount of the phosgene required will generally depend upon the amount of the dihydric phenol present. Generally speaking, one mole of phosgene will react with one mole of the dihydric phenol to provide the polymer and two moles of HCl. Two moles of HCl are in turn "attached" by an acid acceptor, preferably present. The foregoing are herein referred to as stoichiometric or theoretical amounts.

A suitable acid acceptor present in the reaction mixture may be either organic or inorganic in nature. Representative of an organic acid acceptor is a tertiary amine such as pyridine, triethylamine, dimethylaniline, tributylamine, etc. An inorganic acid acceptor may be one which can be either a hydroxide, a carbonate, a bicarbonate, or a phosphate or an alkali or alkaline earth metal hydroxide.

Dihydric phenol reactants employed to prepare the copolyester-polycarbonate resins subjected to thermal degradation to obtain resins of the invention are generally well known compounds as are methods of their preparation. Representative of such dihydric phenols are phenolic diols of the general formula:

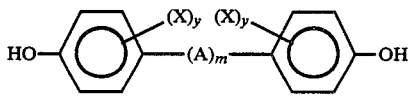

wherein A is selected from the group consisting of a divalent hydrocarbon containing from 1 to about 15 carbon atoms; a substituted divalent hydrocarbon radical containing from 1 to about 15 carbon atoms and substituent groups such as halogen;

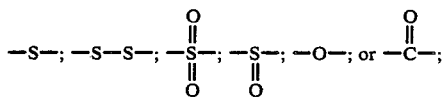

and wherein each X is independently selected from the group consisting of halogen, a monovalent hydrocarbon radical such as an alkyl group of from 1 to about 8 carbon atoms, an aryl group of from 6–18 carbon atoms, an aralkyl group of from 7 to about 14 carbon atoms, an oxyalkyl group of from 1 to about 8 carbon atoms, and an oxyaryl group of from 6 to 18 carbon atoms; and wherein m is zero or 1 and y is a whole number integer of from 0 to 4.

Typical of some of the dihydric phenols that can be advantageously employed in the practice of the present invention are bis-phenols such as bis(4-hydroxyphenyl)methane, 2,2-bis(4-hydroxyphenyl)propane (also known as bisphenol A), 2,2-bis(4-hydroxy-3-methylphenyl)propane, 4,4-bis(4-hydroxyphenyl)heptane, 2,2bis(4-hydroxy-3,5-dichlorophenyl)propane, 2,2-bis(4-hydroxy-3,5-dibromophenyl)propane, etc.; dihydric phenol ethers such as bis(4-hydroxyphenyl)ether, bis(3,5-dichloro-4-hydroxyphenyl)ether, etc.; dihydroxydiphenyls such as p,p'-dihydroxydiphenyl, 3,3-dichloro-4,4'-dihydroxydiphenyl, etc.; dihydroxyaryl sulfones such as bis(4-hydroxyphenyl) sulfone, bis(3,5-dimethyl-4-hydroxyphenyl)sulfone, etc.; dihydroxy benzenes, resorcinol, hydroquinone, halo- and alkyl-substituted dihydroxy benzenes such as 1,4-dihydroxy-2,5-dichlorobenzene, 1,4-dihydroxy-3-methylbenzene, etc.; and dihydroxy diphenyl sulfides and sulfoxides such as bis(4-hydroxyphenyl)sulfide and bis(4-hydroxyphenyl)sulfoxide, bis(3,5-dibromo-4-hydroxyphenyl)sulfoxide, etc. A variety of additional dihydric phenols are also available and are disclosed in U.S. Pat. Nos. 2,999,835; 3,028,365 and 3,153,008, all of which are incorporated herein by reference. It is, of course, possible to employ two or more different dihydric phenols or a combination of a dihydric phenol with glycol.

Preferred dihydric phenols of Formula (III) are the 4,4'-bisphenols.

The carbonate precursor employed in the preparation of the polycarbonate and polyester-carbonate subjected to thermal degradation to prepare the resins of the invention may be a carbonyl halide, a diarylcarbonate, or a bishaloformate. The carbonyl halides include carbonyl bromide, carbonyl chloride, and mixtures thereof. The bishaloformates include the bishaloformates of dihydric phenols such as bischloroformates of dihydric phenols such as bischloroformates of 2,2-bis(4-hydroxyphenyl)propane, hydroquinone, and the like; or the bischloroformates of glycols such as the bischloroformates of neopentyl glycol and the like.

The preferred carbonate precursors are the carbonyl halides, with carbonyl chloride, also known as phosgene, being the preferred carbonyl halide Dicarboxylic acids of the formula (II) given above may be prepared by the reaction of trimellitic anhydride (IV) with an aliphatic alcohol (V) according to the schematic formulae:

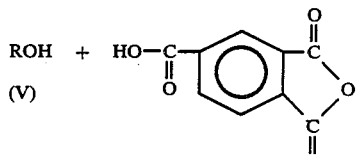

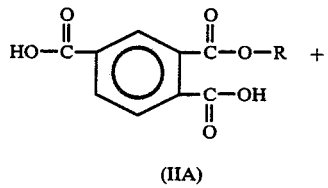

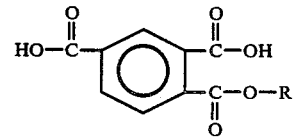

wherein R has the meaning previously ascribed to it. Preferably R represents an alkyl or a cycloalkyl group amenable to removal by thermal degradation.

The terms "alkyl" and "cycloalkyl" as used herein means the monovalent moiety obtained upon removal of one hydrogen atom from a parent aliphatic hydrocarbon. Representative of alkyl is ethyl, propyl, n-butyl, pentyl, hexyl, heptyl, octyl, nonyl, decyl, and isomeric forms thereof. Representative of cycloalkyl are cyclopentyl and cyclohexyl.

The above-illustrated reaction for preparation of the isomers of formulae (IIA) and (IIB) may be carried out by mixing stoichiometric proportions of the reactants (IV) and (V) and heating the mixture, preferably to a temperature of circa 100° C. to 200° C. either neat or in the presence of an inert organic solvent. The term "inert organic solvent" as used herein means an organic solvent for the reactants which does not enter into reaction with the reactants (IV) or (V) or adversely affect the desired course of the reaction. Representative of inert organic solvents are methyl ethyl ketone, methyl isobutyl ketone and the like. The general procedure for the preparation of the Compounds (II) is well known and may be found, for example, in U.S. Pat. No. 3,578,638.

Aliphatic alcohols of the formula (V) given above are well known compounds as are methods of their preparation. Representative of aliphatic alcohols of the formula (V) are isopropyl alcohol and the like.

In addition to the dicarboxylic acids of formula (II) given above, the polyester-carbonate resins subjected to thermal degradation to obtain the resins of the invention may optionally contain reaction residues of other difunctional carboxylic acids, conventionally used in the preparation of copolyester-polycarbonate resins. In general, any difunctional carboxylic acid conventionally used in the preparation of linear polyesters may optionally be utilized in the preparation of the copolyester-carbonate resins of the instant invention. Generally, the carboxylic acids which may be optionally utilized include the aliphatic carboxylic acids, the aromatic carboxylic acids, and the aliphaticaromatic carboxylic acids. These acids are well known and are disclosed in U.S. Pat. No. 3,169,121, which is hereby incorporated herein by reference. Representative of such difunctional carboxylic acids are difunctional carboxylic acids of the formula:

$$R^4\text{-}(R^5)_q\text{COOH} \qquad (VI)$$

wherein $R^5$ is an alkylene, alkylidene, or cycloaliphatic group; an alkylene, alkylidene or cycloaliphatic group containing ethylenic unsaturation; an aromatic group such as phenylene, biphenylene, and the like; two or more aromatic groups connected through non-aromatic linkages such as alkylene or alkylidene groups; and a divalent aralkyl radical such as tolylene, xylylene, and the like. $R^4$ is either a carboxyl or a hydroxyl group. The letter q represents one where $R^4$ is a hydroxyl group and either zero or one where $R^4$ is a carboxyl group.

Preferred difunctional carboxylic acids optionally employed are the aromatic dicarboxylic acids. Particularly useful aromatic dicarboxylic acids are those represented by the general formula:

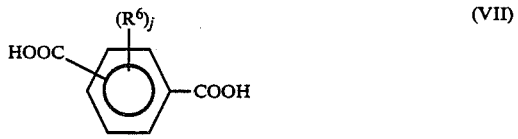

wherein j is a positive whole integer having a value of from 0 to 4 inclusive; and $R^6$ is independently selected from the group consisting of alkyl radicals, preferably lower alkyl radicals containing from 1 to about 5 carbon atoms.

Mixtures of these optional difunctional carboxylic acids may be employed as well as single acids. Therefore, where the term difunctional carboxylic acid is used herein it is to be understood that this term includes mixtures of two or more different difunctional carboxylic acids as well as individual carboxylic acids.

Preferred optional aromatic dicarboxylic acids are isophthalic acid, terephthalic acid, and mixtures thereof. A particularly useful carboxylic acid comprises a mixture of isophthalic acid and terephthalic acid wherein the weight ratio of terephthalic acid to isophthalic acid is in the range of from about 9:1 to about 0.2:9.8.

Rather than utilizing the optional difunctional carboxylic acid per se, it is possible, and sometimes even preferred, to employ the reactive derivatives of said acid. Illustrative of these reactive derivatives are the acid halides. The preferred acid halides are the acid dichlorides and the acid dibromides. Thus, for example, instead of using isophthalic acid, terephthalic acid, or mixtures thereof, it is possible to employ isophthaloyl dichloride, terephthaloyl dichloride, and mixtures thereof.

Also included within the scope of the instant invention are randomly branched copolyester-carbonate resins wherein a minor amount (typically between 0.05 and 2 mole percent, based on the quantity of dihydric phenol used) of a polyfunctional aromatic compound is a co-reactant with the dihydric phenol in the reaction mixture, comprising also the carbonate precursor and the ester precursor, to provide a thermoplastic randomly branched copolyester-carbonate. These polyfunctional aromatic compounds contain at least three functional groups which may be hydroxyl, carboxyl, carboxylic anhydride, haloformyl, or mixtures thereof. Some illustrative non-limiting examples of these polyfunctional compounds include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic acid anhydride, and the like. Other organic polyfunctional compounds useful in making these randomly branched copolyester-carbonates are disclosed in U.S. Pat. Nos. 3,635,895 and 4,001,184, both of which are incorporated herein by reference.

The proportions of reactants employed to prepare the copolyester-carbonate resins subjected to thermal degredation to obtain resins of the invention containing a unit of the formula (I) given above will vary in accordance with the proposed use of the product resin. When the product resin containing the divalent moieties of the formula I given above is to be used as an intermediate in the preparation of a branched, essentially thermoplastic resin, the dihydric phenol and carbonate precursor are advantageously employed in substantially equivalent molar proportions and from about 0.1 to 1.0 mole percent of the dicarboxylic acid of formula II is employed. When the product resin containing the divalent moieties of the formula I given above is to be used as an intermediate in the preparation of a cross-linked resin, from about 1.0 to about 25 mole percent of the dicarboxylic acid of formula II is employed. For these resins proportionally less of the carbonate precursor may be used to allow for replacement of carbonate units by dicarboxylic acid units in the polymer chain. In the preceding discussion, mole percent is defined as moles of dicarboxylic acid divided by moles of bisphenol multiplied by 100.

The copolyester-carbonate resins described above as precursors for the resins of the invention containing the polymer units of formula (I) given above are converted to the resins of the invention by thermal degradation, i.e.; exposure to temperatures of 100° to 350° C., preferably 200° to 300 ° C. for a period of time sufficient to effect removal of the R group. Under the conditions of the thermolytic degradation to remove the R groups (see Formula IIA and IIB) the units of formula (I) are formed, creating a cross-linking site (a carboxyl group-bearing moiety), the transitory resin intermediate of the invention. The active crossing-link site may immediately react to cross-link with an adjacent polycarbonate or copolyester-carbonate resin chain.

This is believed to occur by reaction of the free $CO_2H$ group with a carbonate or ester functional group in a repeat unit of the resin chain.

The resins of the invention may be used in admixture with previously known polycarbonates and copolyester-carbonates as branching or cross-linking agents by admixture of the precursor resin containing R groups with the polycarbonate or copolyester-carbonate to be branched or cross-linked, and forming the resin containing the units of formula (I) in-situ.

The thermoplastic molding resin compositions of the instant invention containing units of the formula (I) or its precursor resin may also be admixed with various commonly known and used additives such as, for example, antioxidants; antistatic agents; inert fillers such as glass, talc, mica, and clay; ultraviolet radiation absorbers such as the benzophenones, benzotriazoles, and the like; hydrolytic stabilizers such as the epoxides disclosed in U.S. Pat. Nos. 3,489,716, 4,138,379 and 3,839,247, all of which are incorporated herein by reference; color stabilizers such as the organophosphites; thermal stabilizers such as a phosphite; flame retardants; and mold release agents. A wide variety of flame retardancy additives useful in polycarbonate and copolyester-carbonate resin compositions are known and may be employed herein.

Some particularly useful flame retardants are the alkali and alkaline earth metal salts of sulfonic acids. These types of flame retardants are disclosed in U.S. Pat. Nos. 3,933,734; 3,931,100; 3,978,024; 3,948,851; 3,926,980; 3,919,167; 3,909,490; 3,953,396; 3,953,300; 3,917,559; 3,951,910 and 3,940,366, all of which are hereby incorporated herein by reference.

The following examples and preparations describe the manner and process of making and using the invention and set forth the best mode contemplated by the inventor of carrying out the invention but are not to be construed as limiting the invention. Where reported, the following tests were carried out.

Intrinsic Viscosity

The intrinsic viscosity was measured at a temperature of 25° C. in methylene chloride and is reported in deciliters/gram (dl/g).

Degree of Cross-Linking (gel formation)

5 grams of the resin is placed in a Petri dish and dried for 4 hours at a temperature of 110° C. The dish is then placed in a vacuum oven and heated to a temperature of 300° C. under a vacuum of about 5 mm Hg for 0.5 hours or 1 hour. The percentage of gel content is then determined by soaking the resin sample in methylene chloride for 24 hours, washing the soaked material thoroughly with additional methylene chloride and determining the residual weight. The percentage of gel is the residual weight divided by the original weight of the heat-aged material.

Preparation 1

To a suitable reaction vessel there is charged trimellitic anhydride and a 2.5X molar excess of isopropyl alcohol. The charge is heated to reflux temperature for about one hour. At the end of this time period an aliquot of the reaction mixture shows an absence of anhydride (by infra-red analysis). Residual unreacted isopropyl alcohol was removed on a rotary evaporator. The product is the isopropyl alcohol monoester of 1,2,4-benzene tricarboxylic acid.

EXAMPLE 1 (COMPARATIVE EXAMPLE)

This example is not an example of the invention but is made for comparative purposes.

A reactor vessel fitted with a mechanical agitator is charged with 560 ml of deionized water, 680 ml of methylene chloride, 114 g (0.5 moles) of bisphenol-A, 2.8 ml (0.02 mole) of triethylamine and 2.3 g (0.025 moles) of phenol. Phosgene is introduced into the charge while the charge is agitated. Phosgene is added at a rate of 1 g/minute for 60 minutes (0.6 moles) while the pH of the resulting reaction mixture is maintained between 9.5 and 11.5. The pH was adjusted to 11 at the end of the reaction. The pH adjustments are made by the addition of 25% aqueous sodium hydroxide. After phosgenation has been terminated, the brine layer is separated from the resin solution and the resin solution is washed with 3 weight percent aqueous HCl and with water. The resin is then precipitated and isolated by addition of the resin solution to 3000 ml methanol in a Waring blender.

Representative portions of the resin are subjected to thermolysis and analysis to determine the degree of cross-linking by the procedure described above. The analytical results are shown in the table, below.

EXAMPLE 2

The procedure of Example 1, supra., is repeated except that there is also included in the reaction vessel charge 6.3 g (0.025 moles) of the isopropyl alcohol monoester of 1,2,4-benzene tricarboxylic acid prepared in accordance with the procedure of Preparation 1, supra. Also, the pH of the reaction mixture is maintained at a pH of from 5 to 7 for the first 7 minutes after phosgenation is initiated and then at the pH of from 9.5 to 11.5 for 60 minutes. The resin obtained has pendant $OCH(CH_3)_2$ groups. The resin is subjected to thermolysis for ½ hour and 1 hour to convert the $OCH(CH_3)_2$ groups to functional COOH groups, which then in turn crosslink the resin. The results are given in the table, below.

EXAMPLE 3

The procedure of Example 2, supra., is repeated except that the proportion of phenol is increased to 4.6 g (0.05 moles), the proportion of monoester is increased to 12.6 g (0.05 moles) and an initial period of phosgenation for 14 minutes was followed by 60 minutes at a pH of 9.5 to 11.5. The analytical results are shown in the table, below.

EXAMPLE 4

The procedure of Example 2, supra., is repeated except that the proportion of monoester is increased to 12.6 g (0.05 moles) and an initial phosgenation period of 14 minutes was followed by 60 minutes of phosgenation at a pH of 9.5 to 11.5. The analytical results are shown below.

TABLE

| Example No. | Mole Percent Phenol | Mole Percent Monoester | Percent Gels After 300° C./5 mm Thermolysis | | IV Before Thermolysis |
|---|---|---|---|---|---|
| | | | 0.5 hr. | 1 hr. | |
| 1 | 5 | 0 (Control) | 3 | 3 | 0.388 |
| 2 | 5 | 5 | 61 | 84 | 0.376 |
| 3 | 10 | 10 | 8 | 96 | 0.265 |
| 4 | 5 | 10 | 86 | 81 | 0.378 |

What is claim:

1. A thermoplastic polyester-carbonate resin containing in the polymer chain, at least one divalent moiety selected from those of the formulae:

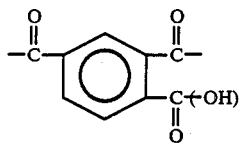

or

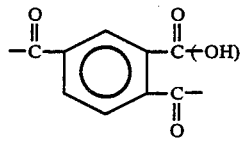

2. A thermoplastic polyester-carbonate resin containing in the polymer chain, at least one divalent moiety selected from those of the formulae:

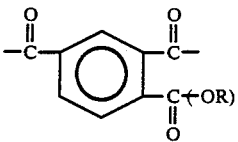

or

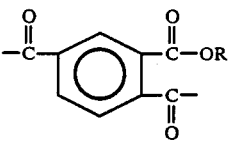

wherein R is a hydrocarbyl group selected from alkyl or cycloalkyl groups amenable to removal by thermal degradation.

3. The resin of claim 2 in admixture with a flame retarding proportion of a flame retardant.

4. The resin of claim 2 folowing thermal degradation to remove the hydrocarbyl group and cross-linking of adjacent resin chains.

5. The admixture of claim 3 wherein the resin has been thermally degraded to remove the hydrocarbyl group and adjacent resin chains are cross-linked.

* * * * *